(12) United States Patent
Zhang

(10) Patent No.: US 12,517,305 B2
(45) Date of Patent: Jan. 6, 2026

(54) FIBER OPTIC CONNECTOR ASSEMBLY

(71) Applicant: WUHAN UF OPTOELECTRIC TECHNOLOGY CO., LTD, Wuhan (CN)

(72) Inventor: Di Zhang, Xi'an (CN)

(73) Assignee: WUHAN UF OPTOELECTRIC TECHNOLOGY CO., LTD, Wuhan (CN)

( * ) Notice: Subject to any disclaimer, the term of this patent is extended or adjusted under 35 U.S.C. 154(b) by 712 days.

(21) Appl. No.: 18/272,131

(22) PCT Filed: Oct. 30, 2020

(86) PCT No.: PCT/CN2020/125085
§ 371 (c)(1),
(2) Date: Jul. 13, 2023

(87) PCT Pub. No.: WO2021/120881
PCT Pub. Date: Jun. 24, 2021

(65) Prior Publication Data
US 2024/0142711 A1    May 2, 2024

(30) Foreign Application Priority Data
Dec. 19, 2019  (CN) .......................... 201911316697.2

(51) Int. Cl.
G02B 6/38       (2006.01)

(52) U.S. Cl.
CPC ......... *G02B 6/3825* (2013.01); *G02B 6/3858* (2013.01); *G02B 6/3893* (2013.01)

(58) Field of Classification Search
CPC ............................ G02B 6/3825; G02B 6/3893
See application file for complete search history.

(56) References Cited

U.S. PATENT DOCUMENTS

| | | | | | |
|---|---|---|---|---|---|
| 4,140,365 | A | * | 2/1979 | Burger ................. | G02B 6/3825 385/72 |
| 5,082,344 | A | * | 1/1992 | Mulholland ......... | G02B 6/3835 385/60 |

(Continued)

FOREIGN PATENT DOCUMENTS

| | | |
|---|---|---|
| CN | 102099720 A | 6/2011 |
| CN | 204009145 U | 12/2014 |

(Continued)

*Primary Examiner* — Michael Stahl
(74) *Attorney, Agent, or Firm* — Bayramoglu Law Offices LLC

(57) ABSTRACT

A fiber optic connector assembly includes a hybrid adapter assembly and fiber optic connectors. The hybrid adapter assembly includes a first adapter and a second adapter connected to each other. The first adapter is connected to a first fiber optic connector, and the second adapter is connected to a second fiber optic connector in abut joint with the first fiber optic connector. The second adapter is provided with a connection arm configured to fasten the second fiber optic connector and is further provided with a transition bridge configured to assist the abut joint between the first fiber optic connector and the second fiber optic connector.

(Continued)

The structure of the fiber optic connector assembly is simplified. After a matching mechanism of the second adapter and the second fiber optic connector is optimized, connection and disconnection can be implemented by plugging and unplugging.

9 Claims, 9 Drawing Sheets

(56) References Cited

U.S. PATENT DOCUMENTS

| | | | | |
|---|---|---|---|---|
| 5,123,071 A * | 6/1992 | Mulholland | ......... | G02B 6/3831 |
| | | | | 385/56 |
| 5,274,729 A * | 12/1993 | King | ............ | G02B 6/3891 |
| | | | | 385/59 |
| 5,333,222 A * | 7/1994 | Belenkiy | ......... | G02B 6/3825 |
| | | | | 385/70 |
| 5,542,015 A * | 7/1996 | Hultermans | ......... | G02B 6/3869 |
| | | | | 385/139 |
| 5,774,611 A * | 6/1998 | Nagase | ............ | G02B 6/3825 |
| | | | | 385/58 |
| 2011/0158586 A1 * | 6/2011 | Katagiyama | ......... | G02B 6/3847 |
| | | | | 385/55 |
| 2016/0320567 A1 * | 11/2016 | Yan | ............ | G02B 6/3893 |
| 2019/0271816 A1 | 9/2019 | Wong et al. | | |
| 2022/0099899 A1 * | 3/2022 | Ott | ............ | G02B 6/3825 |

FOREIGN PATENT DOCUMENTS

| | | |
|---|---|---|
| CN | 204832585 U | 12/2015 |
| CN | 105511027 A | 4/2016 |
| CN | 205157843 U | 4/2016 |
| CN | 106383381 A | 2/2017 |
| CN | 206479676 U | 9/2017 |
| CN | 108196343 A | 6/2018 |
| CN | 108603987 A | 9/2018 |
| CN | 108693606 A | 10/2018 |
| CN | 207937642 U | 10/2018 |
| CN | 109073839 A | 12/2018 |
| CN | 208537779 U | 2/2019 |
| CN | 209746190 U | 12/2019 |
| CN | 110927892 A | 3/2020 |
| JP | 2001183549 A | 7/2001 |
| JP | 2003344705 A | 12/2003 |
| JP | 2004053829 A | 2/2004 |
| WO | 2004013670 A1 | 2/2004 |

* cited by examiner

FIBER OPTIC CONNECTOR ASSEMBLY

CROSS REFERENCE TO THE RELATED APPLICATIONS

This application is the national phase entry of International Application No. PCT/CN2020/125085, filed on Oct. 30, 2020, which is based upon and claims priority to Chinese Patent Application No. 201911316697.2, filed on Dec. 19, 2019, the entire contents of which are incorporated herein by reference.

TECHNICAL FIELD

The present disclosure relates to the technical field of communications, and in particular, to a fiber optic physical docking adapter in a miniaturized package and a connector thereof, especially a fiber optic connector assembly.

BACKGROUND

The connection between optical fibers and the connection between the optical fibers and a device are basically implemented through a connector. With explosive growth of the information Internet and cloud services, the requirements for connection density of the optical fibers are also increasing, that is, more optical fibers must be connected per unit volume. In those high-density connection occasions that require optical path connection, and some optical modules with very limited space, a small-sized connector that is smaller in length and cross-sectional area than conventional connectors and is convenient to install and operate is very necessary. Connection structures of the conventional adapters and conventional connectors take up too much space in the modules, and some research and development engineers usually shorten sheathes of common connectors. However, these methods have technical problems of one kind or another. For example, only shortening the sheathes of the common connectors will not change actual lengths of the connectors very much, because the connectors generally further include parts such as front sleeves and rear sleeves, then there is no change to the size of fitting space. Thus, there is an urgent need for a small-sized connector and adapter assembly solution that has stable and reliable performance.

The invention patent CN201680080282.8 discloses "Fiber-Optic Hybrid Adapter and Connector Assembly", which describes a fiber optic connection assembly that may include a hybrid adapter and a connector assembly. As shown in FIG. 1A, the hybrid adapter can be configured to connect a first connector type and a second connector type, and the first connector type is different than the second connector type. For example, the first connector type may be a micro connector, and the second connector type may be a lucent connector (LC). The proposed solutions solve the above problems, but have the following defects: when a second fiber optic connector is connected to an adapter, the second fiber optic connector needs to move in a linear manner and then in a certain rotational manner to complete a connection and fixation operation with the adapter. This operation is relatively difficult, especially in a module with a small space, and will causes a lot of inconvenience to engineering installation.

The invention patent CN201711425249.7 discloses a fiber optic connector and an assembly method thereof. As shown in FIG. 1B, the connector includes a cover and an insertion core assembly. The cover has a hollow structure, and the insertion core assembly is provided in the hollow structure of the cover. A left opening groove and a right opening groove are formed in a wall of the cover, and the left opening groove and the right opening groove are circumferentially symmetric relative to the central axis of the cover. The cover further includes an upper deformation groove, a lower deformation groove, a deformation bridge, a left movable part, and a right movable part. The upper deformation groove and the lower deformation groove adjacent to each other are connected through the deformation bridge, and both the left movable part and the right movable part are connected to a cover body through the deformation bridge. Although the solutions in the patent do solve the above problems, the patent has the same defects: when the second fiber optic connector is connected to the adapter, movement in two dimensions is required to implement connection and fixation between the second fiber optic connector and the adapter.

Therefore, the prior connector assembly still needs improvement, and its structure and usage method should be optimized to simplify the structure of an adapter connection assembly and optimize its usage. Therefore, a more reasonable technical solution needs to be proposed to solve the technical problems existing in the prior art.

SUMMARY

The present disclosure provides a fiber optic connector assembly. By rationally setting the structure of the fiber optic connector assembly, it is ensured that the structure of the small-sized connector assembly is simplified while ensuring the connection reliability, and the usage of the connector assembly is simplified.

To achieve the above effects, the present disclosure adopts the following technical solutions:

A fiber optic connector assembly includes a hybrid adapter assembly and fiber optic connectors, where the hybrid adapter assembly includes a first adapter and a second adapter connected to each other, the first adapter is connected to a first fiber optic connector, the second adapter is connected to a second fiber optic connector in abut joint with the first fiber optic connector, the second adapter is provided with a connection arm configured to fasten the second fiber optic connector and is further provided with a transition bridge configured to assist the abut joint between the first fiber optic connector and the second fiber optic connector, the second fiber optic connector is provided with a first step matched with the connection arm, and when the second fiber optic connector is inserted into the second adapter, the first step extrudes the connection arm and is connected and locked with the connection arm to implement the abut joint between the first fiber optic connector and the second fiber optic connector.

The connector assembly disclosed above is configured to perform connection of optical fibers and data communication, specifically, two optical fibers can be in abut joint to transmit a data signal, or one optical fiber is connected to an active terminal to transmit the data signal. In the present disclosure, the first adapter may be provided at the active terminal, and may also be an LC type adapter, an SC type adapter, or a conventional connector such as an FC type connected to an optical fiber. Both the structure of the second adapter and the structure of the first adapter can realize connection and cooperation. The first fiber optic connector is specifically configured to fix the optical fiber, and may adopt a certain fiber optic connector in the prior art, or may adopt the same fiber optic connector as the second fiber optic connector. The first fiber optic connector and the second fiber optic connector respectively fix two segments of the optical fiber needing to be connected, and stable abut-joint is implemented with the assistance of the transition bridge. In addition, the connection arm can buckle and tighten the second adapter and the second fiber optic connector, thereby avoiding loosening of the optical fiber after connection, and achieving stable and reliable signal transmission. This connection assembly is not only simple in structure, but also convenient to use, and has high efficiency and good stability during connection operations.

Furthermore, the connection arm is configured to perform connection and matching between the second adapter and the second fiber optic connector. The specific setting solution of the connection arm is not unique and can be implemented in many ways. The following feasible solution is listed herein: there is at least one connection arm, and when there are more than one connection arms, the connection arms are uniformly arranged on the second adapter and fasten the second fiber optic connector.

Preferably, two connection arms are provided, and are arranged opposite to each other. When the first adapter is aligned and matched with the second adapter, the two connection arms can clamp the matching place, thereby reinforcing the connection stability between the first adapter and the second adapter.

Furthermore, when the connection arms are connected, a normal clamping force is provided, and an axial abutting force can also be provided. Specifically, the structure of the connection arm is optimized. The following feasible solution is listed: the connection arm is provided with a locking structure, and the locking structure is configured to be matched with the second fiber optic connector.

Preferably, the locking structure can be configured as a hook-shaped, buckle-shaped or clamping tooth-shaped structure that is convenient for fastening.

Furthermore, the connection arm and the second fiber optic connector are connected in a plug-and-pull manner, which can implement combination and separation through simple linear reciprocating movement. A feasible connection matching solution is proposed herein. Specifically, the following feasible solution is listed: the connection arm is further provided with an unlocking structure, and the unlocking structure is configured to remove the matching between the connection arm and the second fiber optic connector.

Preferably, the unlocking structure can be closely matched with the locking structure, and the unlocking structure adopts an edge-shaped or wing-shaped structure protruding from the connection arm, which is convenient for pushing the connection arm through the unlocking structure, such that the locking structure of the connection arm is released from a locked state. This enables unlocking, thereby separating the second adapter and the second fiber optic connector.

Furthermore, the second fiber optic connector disclosed in the above technical solution is optimized. The following feasible solution is listed: the second fiber optic connector includes a housing, where the housing is provided with a connection hole matched with the connection arm, an insertion hole is formed in the housing, and a pin assembly is provided in the insertion hole. After the pin assembly is placed in the insertion hole, the pin assembly is fixedly connected to the second fiber optic connector, and after the connection arm is matched with the connection hole, the second fiber optic connector can be tensioned to implement tight connection between the second adapter and the second fiber optic connector.

Furthermore, the structure of the second fiber optic connector disclosed in the above technical solution is continuously optimized. The following feasible solution is listed: the insertion hole passes through a front end and a rear end of the housing, the connection hole is communicated with the insertion hole respectively from an upper side and a lower side of the housing, and the pin assembly enters from a rear end of the insertion hole and exits from a front end of the insertion hole.

Furthermore, the pin assembly can also be disassembled in the second fiber optic connector, thereby facilitating disassembly, assembly and maintenance. Therefore, the structure of the second fiber optic connector is optimized to conveniently achieve the above objective. The following feasible solution is listed: a pulling structure is provided on an inner side wall surface of the connection hole, the pulling structure includes an inclined abutting surface, the pulling structure is configured to abut against the connection arm, and the abutting surface is configured to guide the locking structure on the connection arm to remove a connection state between the connection arm and the second adapter.

Preferably, the pulling structure is a blocky protrusion fixed on the housing, and the abutting surface is located on one side of the protrusion adjacent to the rear end of the housing. When the second adapter needs to be withdrawn, the second adapter is drawn outward, the locking structure of the connection arm reaches the abutting surface on the blocky protrusion, and the abutting surface on the blocky protrusion guides the buckled connection arm to open, thereby removing the buckled state between the second adapter and the connection arm.

Furthermore, the pin assembly is the most basic connection fixture for signal transmission, and directly implements fixation and abut-joint of optical fibers. The structure of the pin assembly is optimized herein. A feasible solution is listed: the pin assembly includes an insertion core fixing member provided in the insertion hole, an insertion core is nested in a sleeve, and an optical fiber is provided in the insertion core.

Furthermore, to reinforce the installation stability of the pin assembly in the second fiber optic connector, the structure of the pin assembly and the structure of the second fiber optic connector are optimized herein. The following feasible solution is listed: the first step is provided on the insertion core fixing member, a second step and a third step are further sequentially provided on the insertion core fixing member, the first step is adjacent to the front end of the insertion hole and is configured to be in buckling fit with the connection arm, a step surface abutting against the second step is provided at a middle of the insertion hole, the step surface limits movement of the insertion core fixing member towards the rear end of the insertion hole, an elastic abutting structure is provided at the rear end of the insertion hole, and the elastic abutting structure abuts against the third step and limits movement of the insertion core fixing member towards the front end of the insertion hole.

Preferably, both the first step and the third step are inclined surface steps, the second step is a straight surface step, and a step surface of the second step is perpendicular to the outer side surface of the insertion core fixing member.

Preferably, the elastic abutting structure disclosed in the above technical solution can adopt a structure such as an elastic piece. When the insertion core fixing member is inserted into the insertion hole, the elastic abutting structure abuts against the third step to avoid excessive movement of the insertion core fixing member towards the front end of the insertion hole; and when the second fiber optic connector is disconnected from the first fiber optic connector and retreated outward, the elastic abutting structure can drive and pull out the insertion core fixing member together.

Furthermore, the above solution discloses one structure of the pin assembly and the second fiber optic connector, and another structure is listed herein. Specifically, the housing is connected and matched with the connection arm, the first step is provided on the insertion core fixing member, a second step and a third step are further sequentially provided on the insertion core fixing member, a step surface abutting against the second step is provided at a middle of the insertion hole, the second step is provided with an elastic portion and elastically abuts against the step surface, an elastic abutting structure is provided at the rear end of the insertion hole, and the elastic abutting structure abuts against the third step and limits movement of the insertion core fixing member towards the front end of the insertion hole.

In the second structure of the pin assembly and the second fiber optic connector, the pulling structure on the housing and the connection arm can be set as a tightly connected matching structure, thereby implementing tight connection of the second fiber optic connector, the second adapter and the first adapter. The elastic portion of the second step can provide a pretightening force to abut a first fiber optic connection portion against a second fiber optic connection portion, thereby ensuring the stability of signal transmission.

Compared with the prior art, the present disclosure has the following beneficial effects.

According to the present disclosure, the structure of the fiber optic connector assembly is simplified. After the matching mechanism of the second adapter and the second fiber optic connector is optimized, connection and disconnection can be implemented by plugging and unplugging. In addition, the locking structure is provided at the junction between the second adapter and the second fiber optic connector to improve the abut-joint stability of optical fibers and ensure stable and reliable communication transmission.

BRIEF DESCRIPTION OF THE DRAWINGS

To describe the technical solutions in the embodiments of the present disclosure more clearly, the drawings required for describing the embodiments are briefly described below. It should be understood that the following drawings show merely some embodiments of the present disclosure, and thus should not be regarded as a limitation to the scope. A person of ordinary skill in the art may still derive other related drawings from these drawings without creative efforts.

Figure 1A:
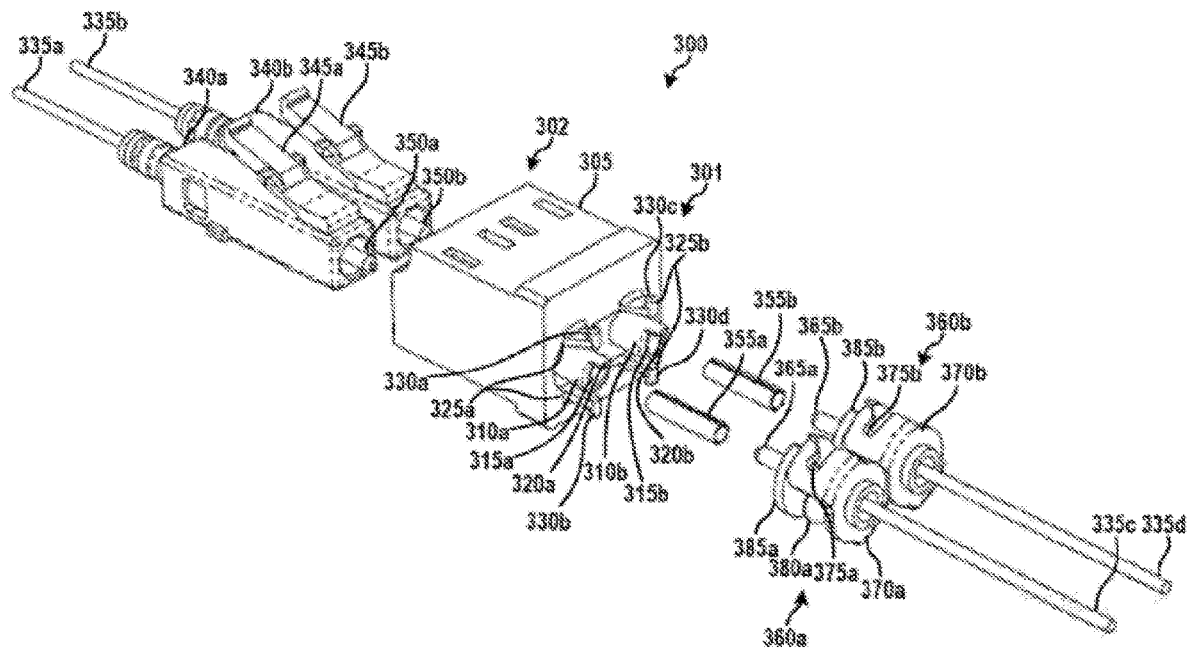
FIG. 1A is a schematic diagram of a fiber optic hybrid adapter and connector assembly in the prior art (patent number: 201680080282.8)
Figure 1B:
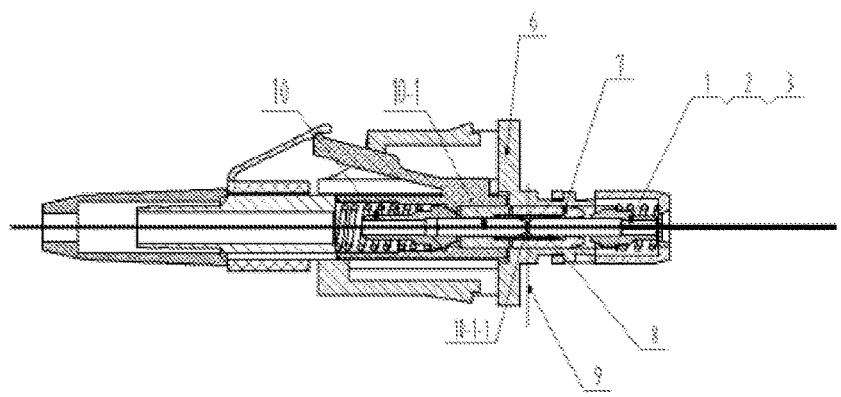
FIG. 1B is a schematic diagram of a small-sized connector and an adapter thereof in the prior art (patent number: 201711425249.7)
Figure 2:
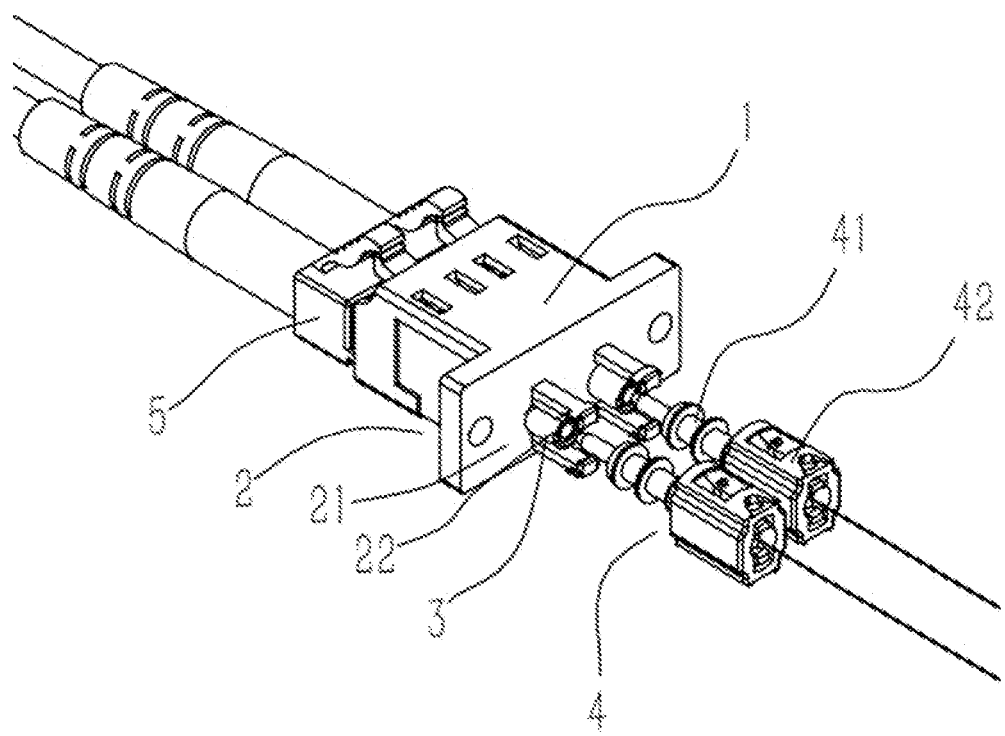
FIG. 2 is a schematic diagram showing an overall structure of a connector assembly.

Reference numerals in the figures: 1. First adapter; 2. Second adapter; 21. End part; 22. Connection arm; 23. Locking structure; 3. Transition bridge; 31. Retainer; 32. Limiting structure; 4. Second fiber optic connector; 41. Pin assembly; 411. First step; 412. Second step; 413. Third step; 414. Insertion core; 415. Optical fiber; 42. Housing; 421. Elastic abutting structure; 422. Pulling structure; 423. Step surface; 424. Tightening port, 425. Insertion hole; 426. Connection hole; 5. First fiber optic connector; and 6. Collimation sleeve.

DETAILED DESCRIPTION OF THE EMBODIMENTS

The present disclosure will be further described below with reference to the accompanying drawings and specific embodiments.

It should be noted here that the description of these examples is used to help understand the present disclosure, but does not constitute a limitation to the present disclosure. The specific structural and functional details disclosed herein are only used to describe illustrative examples of the present disclosure. However, the present disclosure may be embodied in many alternative forms, and it should not be understood that the present disclosure is limited to the examples set forth herein.

The terms used herein are only used to describe specific examples, and are not intended to limit illustrative examples of the present disclosure. As used herein, the singular forms "a", "an", and "the" are intended to include plural forms, unless the context clearly indicates the opposite. It should also be understood that the terms "include", "includes", "comprises", and/or "comprises", when used herein, specify the existence of the stated features, integers, steps, operations, units, and/or components, which do not exclude the existence or addition of one or more other features, quantities, steps, operations, units, and components, and/or combinations thereof.

It should also be noted that, in some alternative examples, the functions/actions may appear in an order different from that shown in the figures. For example, some involved functions/actions may actually be executed substantially concurrently, or sometimes two figures shown in succession may be executed in a reverse order.

Specific details are provided in the following description to facilitate a complete understanding of the illustrative examples. However, those of ordinary skill in the art should understand that the illustrative examples can be implemented without these specific details. For example, the system may be shown in a block diagram to avoid the problem that an example is illustrated unclearly due to unnecessary details. In other examples, well-known procedures, structures, and technologies may not be shown in unnecessary details to avoid making the illustrative examples unclear.

Embodiment 1

As shown in FIG. 2 to FIG. 6, this embodiment discloses a fiber optic connector assembly, including a hybrid adapter assembly and fiber optic connectors. The hybrid adapter assembly includes first adapter 1 and second adapter 2 connected to each other, the first adapter 1 is connected to first fiber optic connector 5, and the second adapter 2 is connected to second fiber optic connector 4 in abut joint with the first fiber optic connector 5. The second adapter 2 is provided with connection arm 22 configured to fasten the second fiber optic connector 4 and is further provided with transition bridge 3 configured to assist the abut joint between the first fiber optic connector 5 and the second fiber optic connector 4. The second fiber optic connector is provided with first step 411 matched with the connection arm 22. When the second fiber optic connector is inserted into the second adapter, the first step 411 extrudes the connection arm 22 and is connected and locked with the connection arm to implement the abut joint between the first fiber optic connector and the second fiber optic connector.

In this embodiment, the connection arm 22 is provided with a buckle, and the second fiber optic connector is clamped and locked with the buckle.

Figure 16:
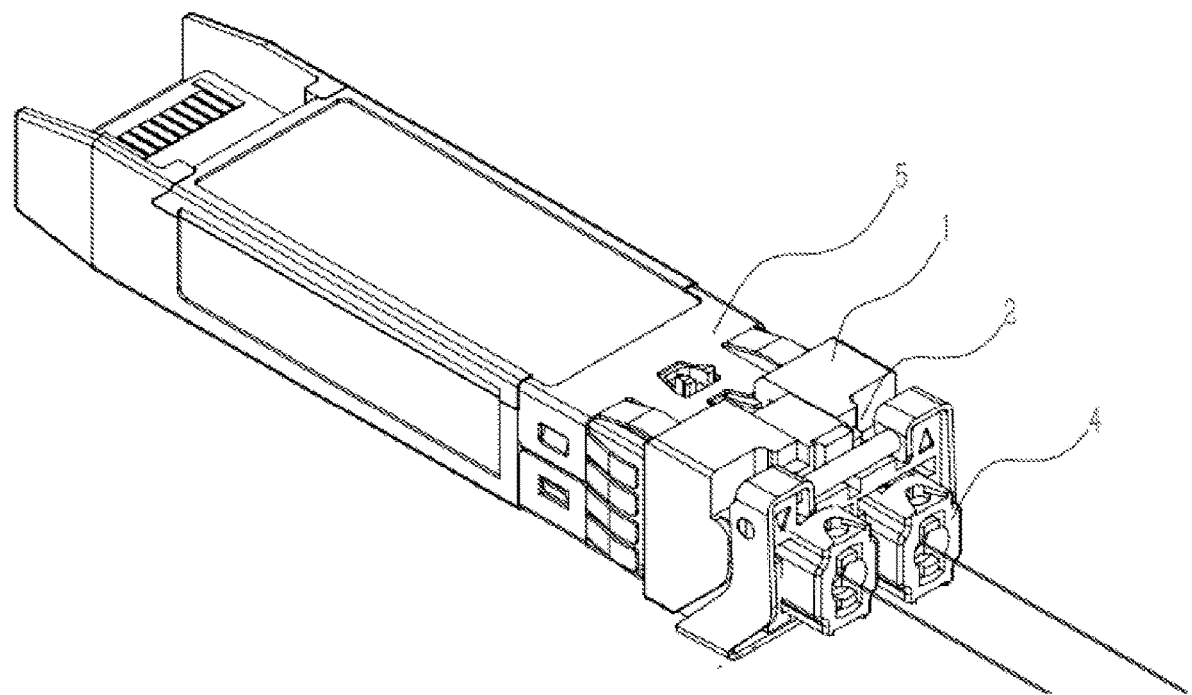
FIG. 16 is a schematic diagram of connection and use between a connector assembly and an active terminal.

The connector assembly disclosed above is configured to perform connection of optical fibers 415 and data communication. As shown in FIG. 16, two optical fibers 415 can be in abut joint to transmit a data signal, or one optical fiber 415 is connected to an active terminal to transmit the data signal. In the present disclosure, the first adapter 1 may be provided at the active terminal, and may also be an LC type adapter, an SC type adapter, or a conventional connector such as an FC type connector connected to an optical fiber 415. Both the structure of the second adapter 2 and the structure of the first adapter 1 can realize connection and cooperation. The first fiber optic connector 5 is specifically configured to fix the optical fiber 415, and may adopt a certain fiber optic connector in the prior art, or may adopt the same fiber optic connector as the second fiber optic connector 4. The first fiber optic connector 5 and the second fiber optic connector 4 respectively fix two segments of the optical fiber 415 needing to be connected, and stable abut-joint is implemented with the assistance of the transition bridge 3. In addition, the connection arm 22 can buckle and tighten the second adapter 2 and the second fiber optic connector, thereby avoiding loosening of the optical fiber 415 after connection, and achieving stable and reliable signal transmission. This connection assembly is not only simple in structure, but also convenient to use, and has high efficiency and good stability during connection operations.

Figure 3:
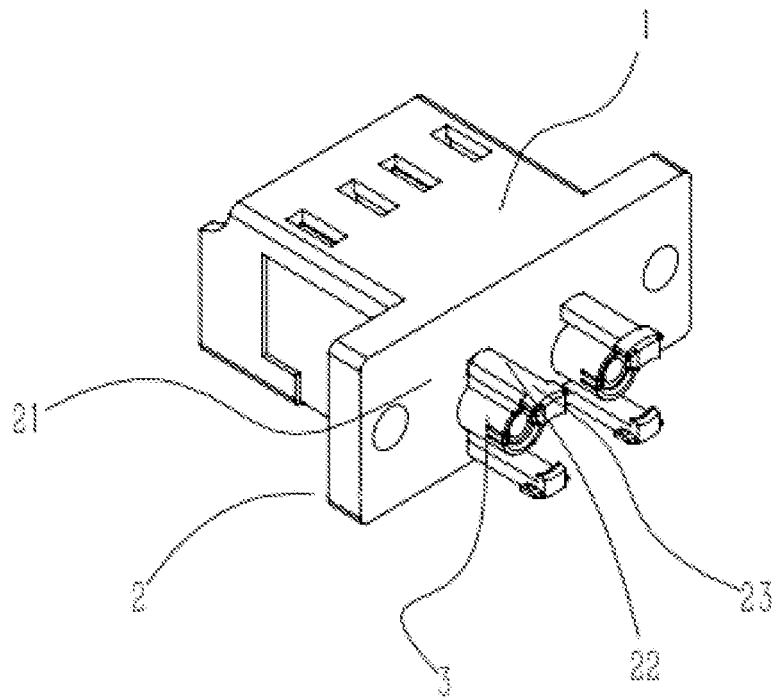
FIG. 3 is a schematic diagram showing an overall structure of a hybrid adapter.

The connection arm 22 is configured to perform connection and matching between the first adapter 1 and the second adapter 2. The specific setting solution of the connection arm 22 is not unique and can be implemented in many ways. The following feasible solution is listed herein: as shown in FIG. 3, there is at least one connection arm 22, and when there are more than one connection arms 22, the connection arms 22 are uniformly arranged on the second adapter 2 and fasten the second fiber optic connector 4.

Figure 4:
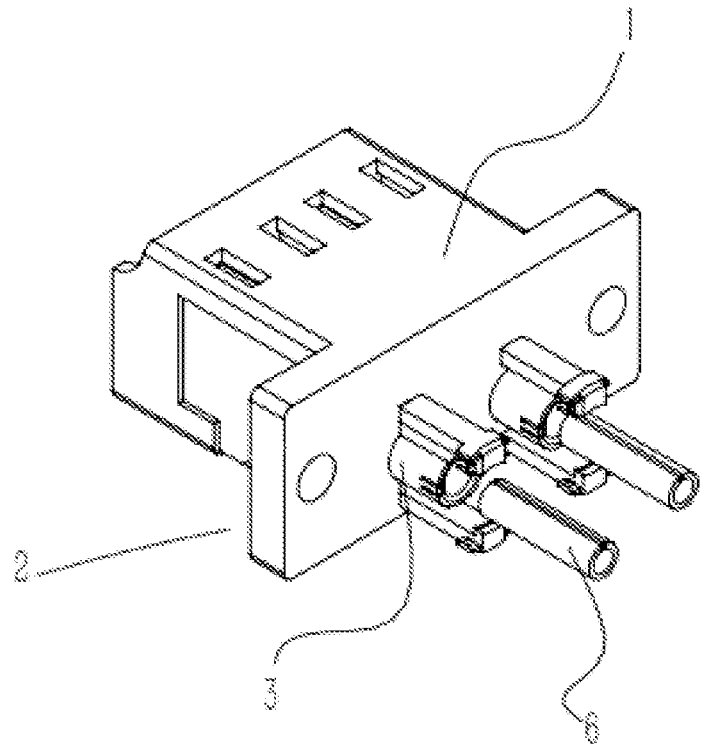
FIG. 4 is a schematic exploded structural diagram of a hybrid adapter.

In this embodiment, the second adapter 2 includes end part 21. As shown in FIG. 3 and FIG. 4, the connection arm 22 is provided on the end part 21, and two connection arms 22 are provided and are arranged opposite to each other. When the first adapter 1 is aligned and matched with the second adapter 2, the two connection arms 22 can clamp the matching place, thereby reinforcing the connection stability between the first adapter 1 and the second adapter 2.

Figure 6:
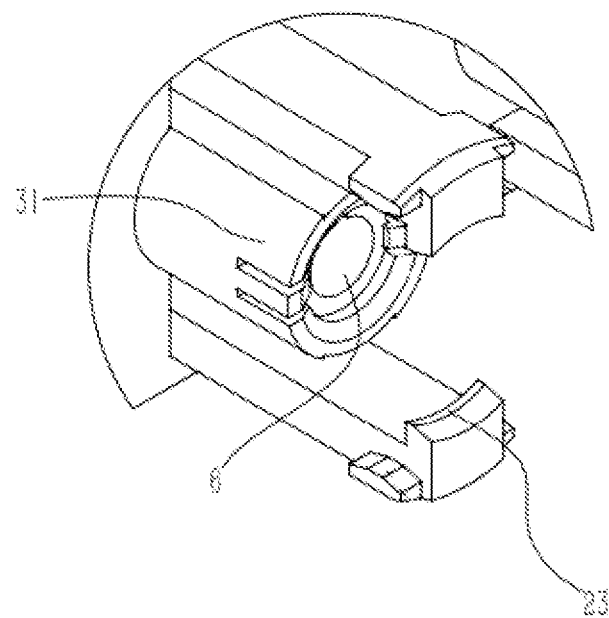
FIG. 6 is a schematic diagram showing a local structure of a hybrid adapter.

When the connection arms 22 are connected, a normal clamping force is provided, and an axial abutting force can also be provided. Specifically, as shown in FIG. 6, the structure of the connection arm 22 is optimized. The following feasible solution is listed: the connection arm 22 is provided with locking structure 23, and the locking structure 23 is configured to be matched with the second fiber optic connector 4.

In this embodiment, the locking structure 23 can be configured as a hook-shaped, buckle-shaped or clamping tooth-shaped structure that is convenient for fastening.

The connection arm 22 and the second fiber optic connector 4 are connected in a plug-and-pull manner, which can implement combination and separation through simple linear reciprocating movement. A feasible connection matching solution is proposed herein. Specifically, the following feasible solution is listed: the connection arm 22 is further provided with an unlocking structure, and the unlocking structure is configured to remove the matching between the connection arm 22 and the second fiber optic connector 4.

In this embodiment, the unlocking structure can be closely matched with the locking structure 23, and the unlocking structure adopts an edge-shaped or wing-shaped structure protruding from the connection arm 22, which is convenient for pushing the connection arm 22 through the unlocking structure, such that the locking structure 23 of the connection arm 22 is released from a locked state. This enables unlocking, thereby separating the first adapter 1 and the second adapter 2.

Figure 10:
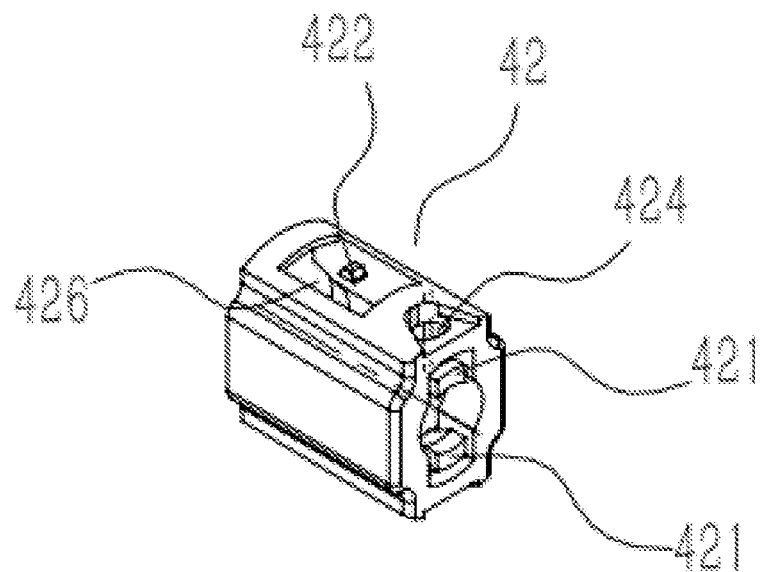
FIG. 10 is a schematic structural diagram of a housing of a second fiber optic connector.
Figure 11:
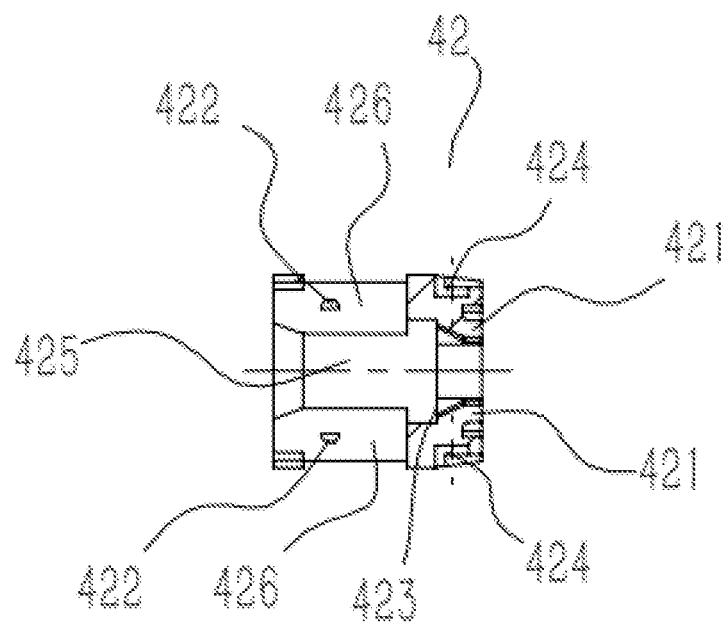
FIG. 11 is a schematic sectional diagram of a housing of a second fiber optic connector.

The second fiber optic connector 4 disclosed in the above technical solution is optimized. The following feasible solution is listed: as shown in FIG. 10 and FIG. 11, the second fiber optic connector 4 includes housing 42, where the housing 42 is provided with connection hole 426 matched with the connection arm 22, insertion hole 425 is formed in the housing 42, and pin assembly 41 is provided in the insertion hole 425. After the pin assembly 41 is placed in the insertion hole 425, the pin assembly 41 is fixedly connected to the second fiber optic connector 4, and after the connection arm 22 is matched with the connection hole 426, the second fiber optic connector 4 can be tensioned to implement tight connection between the first adapter 1 and the second adapter 2.

The insertion hole 425 passes through a front end and a rear end of the housing, the connection hole 426 is communicated with the insertion hole 425 respectively from an upper side and a lower side of the housing, and the pin assembly 41 enters from a rear end of the insertion hole 425 and exits from a front end of the insertion hole 425.

Figure 7:
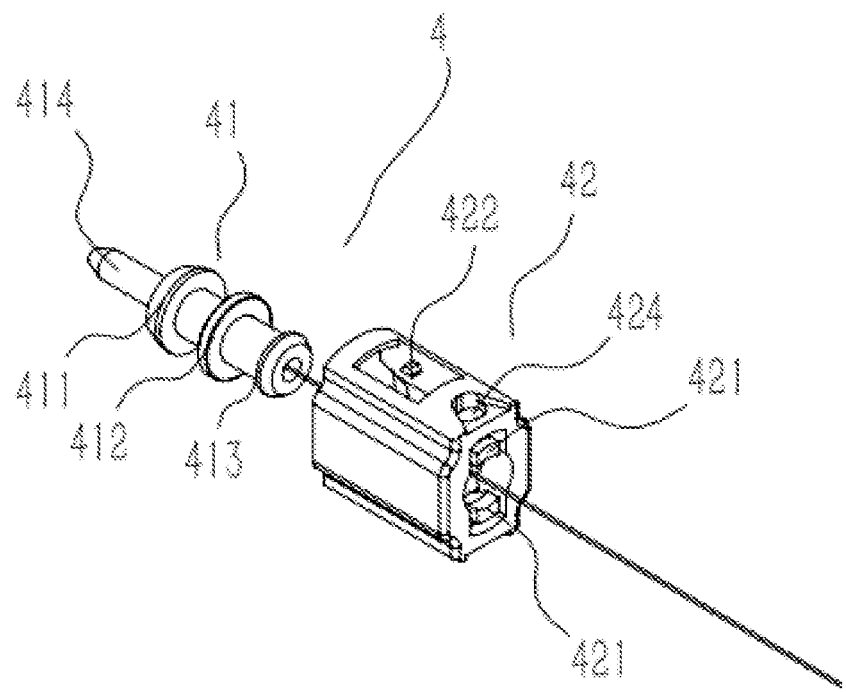
FIG. 7 is a schematic exploded structural diagram of a second fiber optic connector in Embodiment 1.
Figure 8:
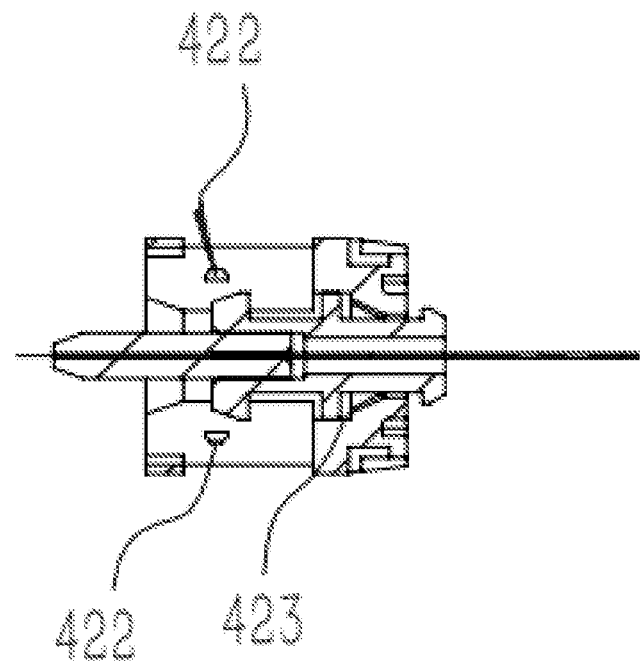
FIG. 8 is a schematic sectional structural diagram of a second fiber optic connector in Embodiment 1.

The pin assembly 41 can also be disassembled in the second fiber optic connector 4, thereby facilitating disassembly, assembly and maintenance. Therefore, the structure of the second fiber optic connector 4 is optimized to conveniently achieve the above objective. The following feasible solution is listed: as shown in FIG. 7 and FIG. 8, pulling structure 422 is provided on an inner side wall surface of the connection hole 426, the pulling structure includes an inclined abutting surface, the pulling structure is configured to abut against the connection arm 22, and the abutting surface is configured to guide the locking structure 23 on the connection arm 22 to remove a connection state between the connection arm 22 and the second adapter.

In this embodiment, the pulling structure is a blocky protrusion fixed on the housing, and the abutting surface is located on one side of the protrusion adjacent to the rear end of the housing. When the second adapter needs to be withdrawn, the second adapter is drawn outward, the locking structure of the connection arm reaches the abutting surface on the blocky protrusion, and the abutting surface on the blocky protrusion guides the buckled connection arm to open, thereby removing the buckled state between the second adapter and the connection arm.

In this embodiment, fastening port 424 is further provided on the housing 42 of the second adapter 2. As shown in FIG. 7, the fastening port 424 is located at the elastic abutting structure 421.

Figure 9:
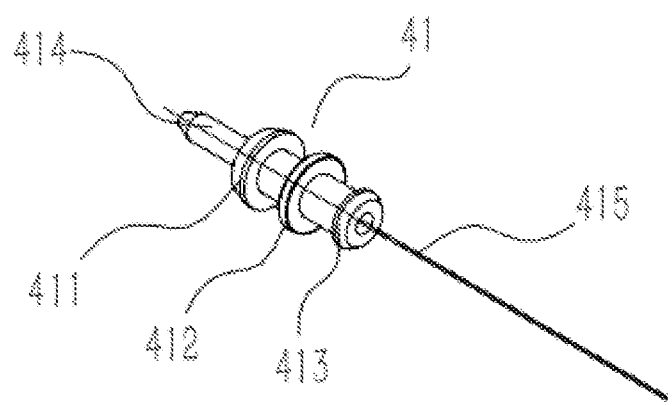
FIG. 9 is a schematic diagram showing an overall structure of a pin assembly in Embodiment 1.

The pin assembly 41 is the most basic connection fixture for signal transmission, and directly implements fixation and abut-joint of optical fibers 415. The structure of the pin assembly 41 is optimized herein. A feasible solution is listed: as shown in FIG. 8 and FIG. 9, the pin assembly 41 includes an insertion core fixing member provided in the insertion hole 425, insertion core 414 is nested in the insertion core fixing member, and optical fiber 415 is provided in the insertion core 414.

To reinforce the installation stability of the pin assembly 41 in the second fiber optic connector 4, the structure of the pin assembly 41 and the structure of the second fiber optic connector 4 are optimized herein. The following feasible solution is listed: as shown in FIG. 8 and FIG. 9, the first step 411 is provided on the insertion core fixing member, second step 412 and third step 413 are further sequentially provided on the insertion core fixing member, the first step 411 is adjacent to the front end of the insertion hole 425 and is configured to be in buckling fit with the connection arm 22, step surface 423 abutting against the second step 412 is provided at a middle of the insertion hole 425, the step surface 423 limits movement of the insertion core fixing member towards the rear end of the insertion hole 425, elastic abutting structure 421 is provided at the rear end of the insertion hole 425, and the elastic abutting structure 421 abuts against the third step 413 and limits movement of the insertion core fixing member towards the front end of the insertion hole 425.

In this embodiment, both the first step 411 and the third step 413 are inclined surface steps, the second step 412 is a straight surface step, and a step surface 423 of the second step 412 is perpendicular to the outer side surface of the insertion core fixing member.

In this embodiment, the elastic abutting structure 421 disclosed in the above technical solution can adopt a structure such as an elastic piece. When the insertion core fixing member is inserted into the insertion hole 425, the elastic abutting structure 421 abuts against the third step 413 to avoid excessive movement of the insertion core fixing member towards the front end of the insertion hole 425, and when the second fiber optic connector 4 is disconnected from the first fiber optic connector 5 and retreated outward, the elastic abutting structure 421 can drive and pull out the insertion core fixing member together.

Embodiment 2

Figure 12:
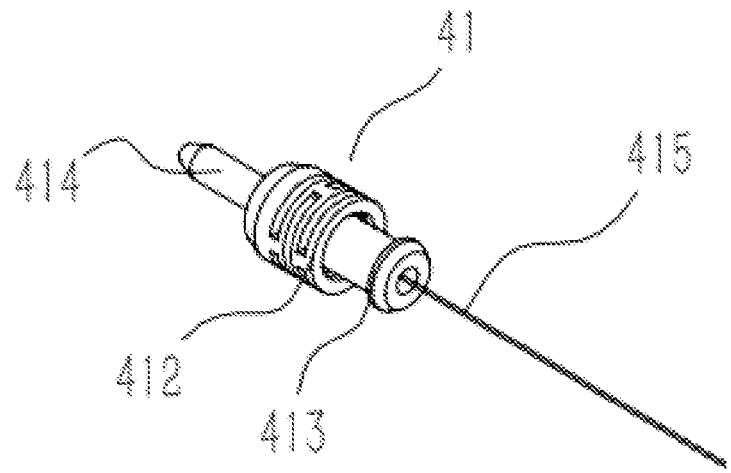
FIG. 12 is a schematic diagram showing an overall structure of a pin assembly in Embodiment 2.
Figure 13:
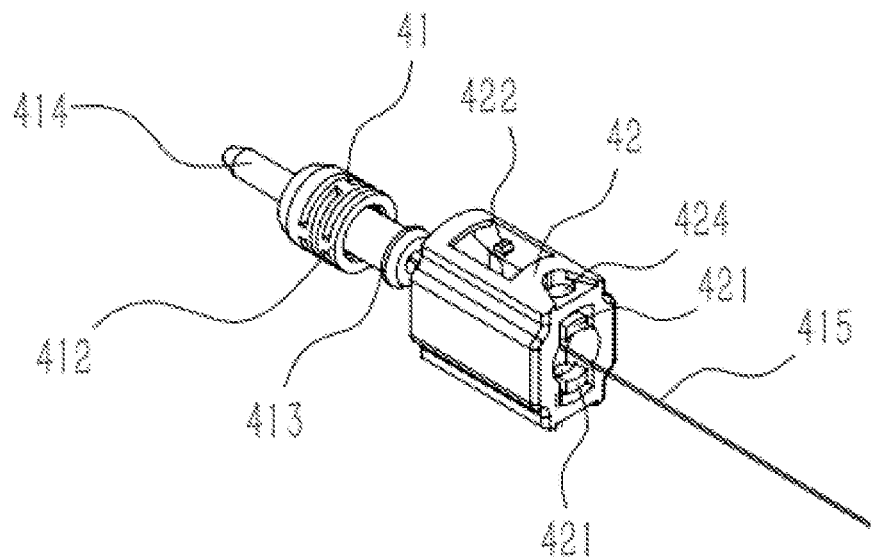
FIG. 13 is a schematic exploded structural diagram of a second fiber optic connector in Embodiment 2.
Figure 14:
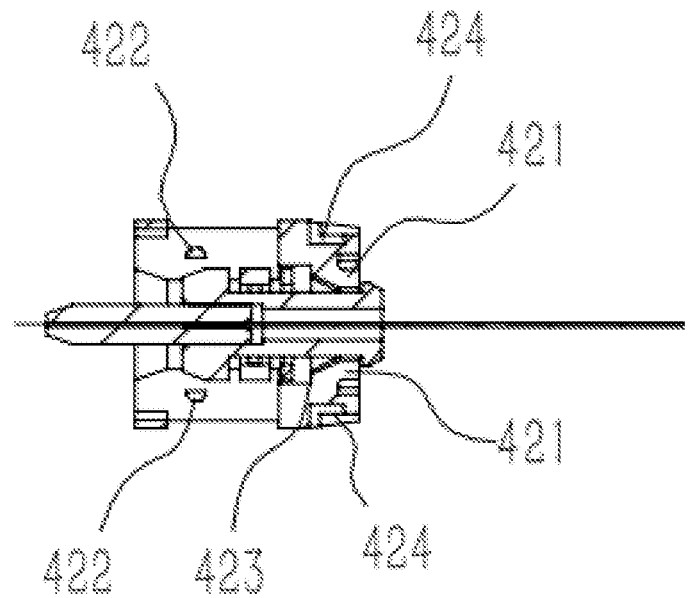
FIG. 14 is a schematic sectional structural diagram of a second fiber optic connector in Embodiment 2.

As shown in FIG. 12 to FIG. 14, this embodiment discloses a fiber optic connector assembly, and the same as Embodiment 1 as follows: the assembly includes a hybrid adapter assembly and fiber optic connectors. The hybrid adapter assembly includes first adapter 1 and second adapter 2 connected to each other, the first adapter 1 is connected to first fiber optic connector 5, and the second adapter 2 is connected to second fiber optic connector 4 in abut joint with the first fiber optic connector 5. The second adapter 2 is provided with connection arm 22 configured to fasten the second fiber optic connector 4 and is further provided with transition bridge 3 configured to assist the abut joint between the first fiber optic connector 5 and the second fiber optic connector 4. The second fiber optic connector is provided with first step 411 matched with the connection arm 22. When the second fiber optic connector is inserted into the second adapter, the first step 411 extrudes the connection arm 22 and is connected and locked with the connection arm to implement the abut joint between the first fiber optic connector and the second fiber optic connector.

This embodiment differs from Embodiment 1 by optimizing the structure of the pin assembly 41 and the structure of the second fiber optic connector 4. Specifically: the housing 42 is connected and matched with the connection arm 22, the first step 411 is provided on the insertion core fixing member, second step 412 and third step 413 are further sequentially provided on the insertion core fixing member, step surface 423 abutting against the second step 412 is provided at a middle of the insertion hole 425, the second step 412 is provided with an elastic portion and elastically abuts against the step surface 423, elastic abutting structure 421 is provided at the rear end of the insertion hole 425, and the elastic abutting structure 421 abuts against the third step 413 and limits movement of the insertion core fixing member towards the front end of the insertion hole 425.

In the second structure of the pin assembly 41 and the second fiber optic connector 4, the pulling structure 422 on the housing 42 and the connection arm 22 can be set as a tightly connected matching structure, thereby implementing tight connection of the second fiber optic connector 4, the second adapter 2 and the first adapter 1. The elastic portion of the second step 412 can provide a pretightening force to abut a first fiber optic 415 connection portion against a second fiber optic 415 connection portion, thereby ensuring the stability of signal transmission.

The structures and connection relationships of other parts in this embodiment are the same as those in Embodiment 1, which will not be repeated herein.

Embodiment 3

Figure 15:
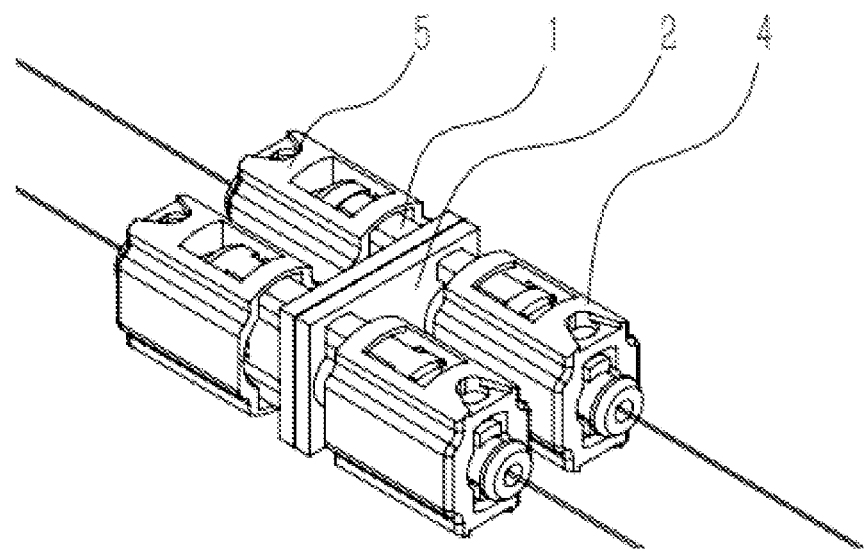
FIG. 15 is a schematic diagram of connection between a first fiber optic connector and a second fiber optic connector in Embodiment 3.

As shown in FIG. 15, this embodiment discloses a fiber optic connector assembly, and the same as Embodiment 1 as follows: the assembly includes a hybrid adapter assembly and fiber optic connectors. The hybrid adapter assembly includes first adapter 1 and second adapter 2 connected to each other, the first adapter 1 is connected to first fiber optic connector 5, and the second adapter 2 is connected to second fiber optic connector 4 in abut joint with the first fiber optic connector 5. The second adapter 2 is provided with connection arm 22 configured to fasten the second fiber optic connector 4 and is further provided with transition bridge 3 configured to assist the abut joint between the first fiber optic connector 5 and the second fiber optic connector 4. The second fiber optic connector is provided with first step 411 matched with the connection arm 22. When the second fiber optic connector is inserted into the second adapter, the first step 411 extrudes the connection arm 22 and is connected and locked with the connection arm to implement the abut joint between the first fiber optic connector and the second fiber optic connector.

This embodiment differs from Embodiment 1 in that the first fiber optic connector 5 adopted in this embodiment is the same as the second fiber optic connector 4. Through such arrangement, the matching of connection is more suitable and stable.

The structures and connection relationships of other parts in this embodiment are the same as those in Embodiment 1, which will not be repeated herein.

Embodiment 4

This embodiment discloses a fiber optic connector assembly, and the same as Embodiment 1 as follows: the assembly includes a hybrid adapter assembly and fiber optic connectors. The hybrid adapter assembly includes first adapter 1 and second adapter 2 connected to each other, the first adapter 1 is connected to first fiber optic connector 5, and the second adapter 2 is connected to second fiber optic connector 4 in abut joint with the first fiber optic connector 5. The second adapter 2 is provided with connection arm 22 configured to fasten the second fiber optic connector 4 and is further provided with transition bridge 3 configured to assist the abut joint between the first fiber optic connector 5 and the second fiber optic connector 4. The second fiber optic connector is provided with first step 411 matched with the connection arm 22. When the second fiber optic connector is inserted into the second adapter, the first step 411 extrudes the connection arm 22 and is connected and locked with the connection arm to implement the abut joint between the first fiber optic connector and the second fiber optic connector.

Figure 5:
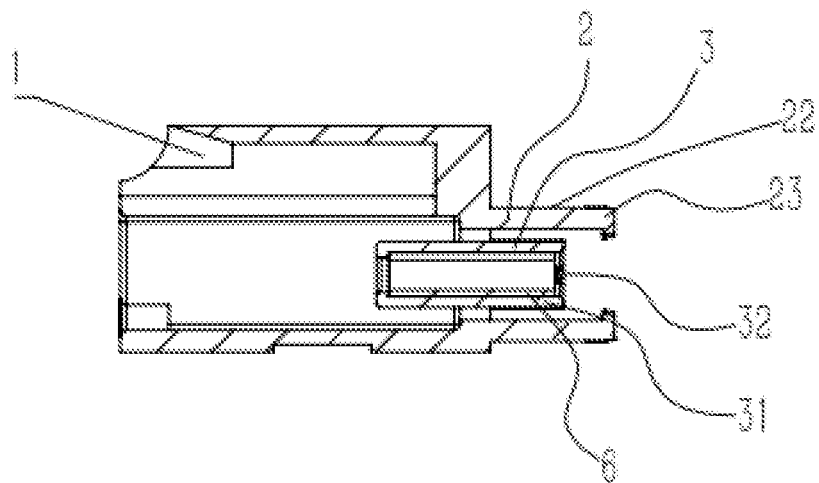
FIG. 5 is a schematic sectional structural diagram of a hybrid adapter.

This embodiment differs from Embodiment 1 by optimizing the connection structure of the first adapter 1 and the second adapter 2. Specifically:

After the first adapter 1 and the second adapter 2 are connected and matched, the optical fibers 415 carried by the two are internally aligned and connected, and data transmission can be performed, and the transition bridge 3 plays an important role in this. The transition bridge 3 aligns the first fiber optic connector 5 and the second fiber optic connector 4, keeps the internal optical fibers 415 strictly aligned, and ensures stable communication transmission. Specifically, the transition bridge 3 disclosed in the above technical solution is optimized. The following feasible solution is listed: as shown in FIG. 4, FIG. 5 and FIG. 6, the transition bridge 3 includes collimation sleeve 6 provided with retainer 31, and the retainer 31 is further provided with limiting structure 32.

In this embodiment, the retainer 31 is fixed on the second adapter 2, can adopt a circular tubular structure, and limits the collimation sleeve 6 inside through the limiting structure 32, to avoid the deviation of the collimation sleeve 6. Specifically, the limiting structure 32 can adopt a matching structure such as a limiting groove and a limiting protrusion. After the collimation sleeve 6 is placed in the retainer 31, the limiting grooves and the limiting protrusions respectively located on the collimation sleeve 6 and the retainer 31 realize snap-fitting, which avoids the deviation of the collimation sleeve 6. In addition, the limiting structure 32 can also adopt a retainer ring structure. When the collimation sleeve 6 is placed in the retainer 31, the retainer ring structure limits a displacement distance of the collimation sleeve 6 in an axial direction, to avoid the deviation of the collimation sleeve 6.

The above are the implementations listed in the present disclosure, but the present disclosure is not limited to the above optional implementations. Those skilled in the art can obtain various implementations by any combination of the above implementations, and anyone can obtain other various implementations under the enlightenment of the present disclosure. The above-mentioned specific implementations should not be construed as limiting the protection scope of the present disclosure, and the protection scope of the present disclosure should be defined by the claims. Moreover, the description can be used to interpret the claims.

What is claimed is:

1. A fiber optic connector assembly, comprising a hybrid adapter assembly, a first fiber optic connector and a second fiber optic connector, wherein the hybrid adapter assembly comprises a first adapter and a second adapter connected to each other, the first adapter is connected to the first fiber optic connector, the second adapter is connected to the second fiber optic connector in abut joint with the first fiber optic connector, the second adapter is provided with a connection arm configured to fasten the second fiber optic connector, the second adapter is further provided with a transition bridge configured to assist the abut joint between the first fiber optic connector and the second fiber optic connector, the second fiber optic connector is provided with a first step matched with the connection arm, and when the second fiber optic connector is inserted into the second adapter, the first step extrudes the connection arm and is connected and locked with the connection arm to implement the abut joint between the first fiber optic connector and the second fiber optic connector, wherein the second fiber optic connector comprises a housing, wherein the housing is provided with a connection hole matched with the connection arm, an insertion hole is formed in the housing, and a pin assembly is provided in the insertion hole, wherein the pin assembly is provided in the insertion hole, the pin assembly comprises an insertion core fixing member, an insertion core is nested in an inner hole of the insertion core fixing member, and an optical fiber is provided in the insertion core, and wherein the first step is provided on the insertion core fixing member, a second step and a third step are further sequentially provided on the insertion core fixing member, the first step is adjacent to a front end of the insertion hole and is configured to be in buckling fit with the connection arm, a step surface abutting against the second step is provided at a middle of the insertion hole, the step surface limits movement of the insertion core fixing member towards a rear end of the insertion hole, an elastic abutting structure is provided at the rear end of the insertion hole, and the elastic abutting structure abuts against the third step and limits movement of the insertion core fixing member towards the front end of the insertion hole.

2. The fiber optic connector assembly according to claim 1, wherein the connection arm is one of a plurality of connection arms, wherein the second adapter is provided with the plurality of connection arms, and wherein the plurality of connection arms are uniformly arranged on the second adapter and fasten the second fiber optic connector.

3. The fiber optic connector assembly according to claim 1, wherein the connection arm is provided with a locking structure, and the locking structure is configured to be matched with the second fiber optic connector.

4. The fiber optic connector assembly according to claim 1, wherein the insertion hole passes through a front end and a rear end of the housing, the connection hole is communicated with the insertion hole respectively from an upper side and a lower side of the housing, and the pin assembly enters from the rear end of the insertion hole and exits from the front end of the insertion hole.

5. The fiber optic connector assembly according to claim 1, wherein a pulling structure is provided on an inner side wall surface of the connection hole, the pulling structure comprises an inclined abutting surface, the pulling structure is configured to abut against the connection arm, and the inclined abutting surface is configured to guide a locking structure on the connection arm to remove a connection state between the connection arm and the second adapter.

6. A fiber optic connector assembly, comprising a hybrid adapter assembly, a first fiber optic connector and a second fiber optic connector, wherein the hybrid adapter assembly comprises a first adapter and a second adapter connected to each other, the first adapter is connected to the first fiber optic connector, the second adapter is connected to the second fiber optic connector in abut joint with the first fiber optic connector, the second adapter is provided with a connection arm configured to fasten the second fiber optic connector, the second adapter is further provided with a transition bridge configured to assist the abut joint between the first fiber optic connector and the second fiber optic connector, the second fiber optic connector is provided with a first step matched with the connection arm, and when the second fiber optic connector is inserted into the second adapter, the first step extrudes the connection arm and is connected and locked with the connection arm to implement the abut joint between the first fiber optic connector and the second fiber optic connector, wherein the second fiber optic connector comprises a housing, wherein the housing is provided with a connection hole matched with the connection arm, an insertion hole is formed in the housing, and a pin assembly is provided in the insertion hole, wherein the pin assembly is provided in the insertion hole, the pin assembly comprises an insertion core fixing member, an insertion core is nested in an inner hole of the insertion core fixing member, and an optical fiber is provided in the insertion core, and wherein the housing is connected and matched with the connection arm, the first step is provided on the insertion core fixing member, a second step and a third step are further sequentially provided on the insertion core fixing member, a step surface abutting against the second step is provided at a middle of the insertion hole, the second step is provided with an elastic portion and elastically abuts against the step surface, an elastic abutting structure is provided at a rear end of the insertion hole, and the elastic abutting structure abuts against the third step and limits movement of the insertion core fixing member towards a front end of the insertion hole.

7. The fiber optic connector assembly according to claim 2, wherein the connection arm is provided with a locking structure, and the locking structure is configured to be matched with the second fiber optic connector.

8. The fiber optic connector assembly according to claim 4, wherein a pulling structure is provided on an inner side wall surface of the connection hole, the pulling structure comprises an inclined abutting surface, the pulling structure is configured to abut against the connection arm, and the inclined abutting surface is configured to guide a locking structure on the connection arm to remove a connection state between the connection arm and the second adapter.

9. The fiber optic connector assembly according to claim 4, wherein the housing is connected and matched with the connection arm, the second step is provided with an elastic portion and elastically abuts against the step surface.

* * * * *